(12) United States Patent
Radecki et al.

(10) Patent No.: US 6,404,428 B1
(45) Date of Patent: Jun. 11, 2002

(54) METHOD AND APPARATUS FOR SELECTIVELY PROVIDING DRAWING COMMANDS TO A GRAPHICS PROCESSOR TO IMPROVE PROCESSING EFFICIENCY OF A VIDEO GRAPHICS SYSTEM

(75) Inventors: Matthew P. Radecki, Oviedo; Timothy M. Kelley, Orlando, both of FL (US)

(73) Assignee: ATI International Srl (BB)

( * ) Notice: Subject to any disclaimer, the term of this patent is extended or adjusted under 35 U.S.C. 154(b) by 25 days.

(21) Appl. No.: 09/717,547

(22) Filed: Nov. 21, 2000

(51) Int. Cl.[7] .............................................. G06T 15/00
(52) U.S. Cl. ...................................................... 345/419
(58) Field of Search ................................ 345/419, 420, 345/422, 426, 428

(56) References Cited

U.S. PATENT DOCUMENTS 6,275,236 B1 * 8/2001 Delahunty .................. 345/473

* cited by examiner

Primary Examiner—Phu K. Nguyen
(74) Attorney, Agent, or Firm—Vedder, Price, Kaufman & Kammholz

(57) ABSTRACT

A video graphics system employs a method and apparatus for selectively providing drawing commands to a graphics processor to improve the processing efficiency of the system. The video graphics system includes a graphics driver, a graphics processor, and a memory. The graphics driver is operably coupled to an application that issues drawing commands to be processed by the video graphics system. Each drawing command includes an address of a location within the memory that includes vertex information for the vertices of one or more graphics primitives to be displayed on a display device operably coupled to the graphics processor. The vertex information is stored in the memory by the application prior to issuance of a drawing command referencing the location in memory of the stored vertex information. Some time after the application stores the vertex information in memory, but preferably not later than responsive to receipt of a drawing command referencing the memory location of the stored vertex information, the graphics driver determines a boundary defining a volume containing the vertices corresponding to the stored vertex information. Responsive to receiving the drawing command, the graphics driver determines whether at least a portion of the boundary intersects a viewing volume of the display device. When at least a portion of the boundary intersects the viewing volume, the graphics driver provides the drawing command to the graphics processor; otherwise, the graphics driver preferably discards the command. The graphics driver is preferably implemented in software and stored on a computer-readable storage medium.

23 Claims, 5 Drawing Sheets

METHOD AND APPARATUS FOR SELECTIVELY PROVIDING DRAWING COMMANDS TO A GRAPHICS PROCESSOR TO IMPROVE PROCESSING EFFICIENCY OF A VIDEO GRAPHICS SYSTEM

FIELD OF THE INVENTION

The invention relates generally to vertex information processing in video graphics systems. More particularly, the present invention relates to a method and apparatus for selectively providing drawing commands to the system's graphics processing engine to improve system processing efficiency.

BACKGROUND OF THE INVENTION

Video graphics systems are commonly used to display two-dimensional (2D) and three-dimensional (3D) objects on display devices, such as computer monitors and television screens. Such systems receive drawing commands and object configuration information from software applications, such as video games or Internet browser applications, process the commands based on the object configuration information, and provide appropriate signals to the display devices to illuminate pixels on the device screens, thereby displaying the objects. A block diagram for a typical video graphics system 100 is depicted in FIG. 1. The video graphics system 100 includes, inter alia, a host processing unit 101, a peripheral component interconnect (PCI) bus 103, a graphics processor 105, memory 107, 109 and a display device 111. The graphics processor 105 is typically located on a video card 113 together with local memory 109 that is accessed and used regularly by the graphics processor 105.

The PCI bus 103 typically includes appropriate hardware to couple the host processing unit 101 to the system memory 107 and the graphics processor 105, and to couple the graphics processor 105 to the system memory 107. For example, depending on the system configuration, the PCI bus 103 may include a memory and bus controller integrated circuit (IC) and an accelerated graphics port (AGP) bus to facilitate direct memory access (DMA) transfers of data stored in the system memory 107 to the graphics processor 105. The display device 111 is typically a conventional cathode ray tube (CRT) display, liquid crystal display (LCD), or other display. Although not shown for purposes of clarity, other components, such as a video frame buffer, a video signal generator, and other known 3D pipeline components, are commonly incorporated between the graphics processor 105 and the display device 111 to properly display objects rendered by the graphics processor 105.

The host processing unit 101 is typically a central processing unit (CPU) or an equivalent microprocessor-based computer. The host processing unit 101 generally executes several software applications with respect to video graphics processing, including a host application 115, an operating system runtime layer 117, and a graphics driver application 119. These applications 115–119 are typically stored on the hard disk component of the system memory 107, a memory card, a floppy disk, a CD-ROM, or some other computer-readable storage medium. The host application 115 is the application that initiates all drawing commands and provides all information necessary for the other graphics applications and processing components to display objects on the display device 111. For example, the host application 115 might be a word processing application, a video game, a computer game, a spreadsheet application, or any other application that requires two-dimensional or three-dimensional objects to be displayed on a display device 111.

In graphics systems, each object to be displayed is typically divided into one or more graphics primitive groups. Common primitive groups include a point list, a line list, and a triangle list. Each primitive group includes a respective number of vertices. For example, a point list primitive group has one or more vertices making up one or more points, a line primitive group has two or more vertices making up one or more lines, and a triangle primitive has three or more vertices making Up one or more triangles. Each vertex has information associated with it to indicate, inter alia, its position in a reference coordinate system and its color. In most applications, such vertex information consists of a vector of multiple parameters to indicate the vertex's position and other optional properties. For example, the vector may include parameters relating to the vertex's normal vector, diffuse color, specular color, other color data, texture coordinates, and fog data. Consequently, the host application 115 not only issues drawing commands, but also provides the vertex information for each vertex of each primitive to be drawn to display each object of a graphics scene.

The operating system runtime layer 117 provides a well-defined application programming interface (API) to the host application 115 and a well-defined device driver interface (DDI) to the graphics driver application 119. That is, the operating system runtime layer 117 is a software layer that enables various host applications 115 to interface smoothly with various graphics driver applications 119. One example of an operating system runtime layer application 117 is the "DIRECTX7" component application of the "WINDOWS" family of operating systems that is commercially available from Microsoft Corporation of Redmond, Wash.

The graphics driver application 119 is the application that provides drawing commands to the graphics processor 105 in a manner understandable by the graphics processor 105. In most circumstances, the graphics driver application 105 and the video card 113 containing the graphics processor 105 are sold as a set to insure proper operation of the graphics rendering portion of the system (i.e., the portion of the graphics system 100 that receives vertex information from the host application 115, processes the vertex information, and generates the appropriate analog signals to illuminate the pixels of the display device 111 as indicated in the vertex information).

During its execution, the host application 115 stores vertex information in either the system memory 107 or the local memory 109 on the video card 113. To store the vertex information, the host application 115 first requests allocation of portions of the respective memory 107, 109 and then stores the vertex information in the allocated portions. The allocated portions of memory 107, 109 are typically referred to as vertex buffers (VBs) 125. In addition, the host application 115 stores transformation matrices in either the system memory 107 or the local memory 109 on the video card 113. The transformation matrices are used by the graphics processor 105 to transform the position vector of each vertex from the so-called "model" coordinate system (i.e., the reference coordinate system used by the application 115 to construct the primitives of the object) to the so-called "eye" or "view" coordinate system (i.e., the coordinate system used to construct objects in the viewing frustum of the display device 111).

The transformed coordinates in the view coordinate system, or view coordinates, properly position each vertex either inside or outside the viewing frustum of the display device 111. As is known, the viewing frustum is the theoretical volume in which objects or graphics primitives can be seen by a user when the user views the display device 111. Thus, the viewing frustum sets the maximum volume in which primitives or objects should be rendered for display by the graphics processor 105.

Three-dimensional views of typical viewing frustums 201, 202 are illustrated in FIG. 2. The first viewing frustum 201 is typically referred to as a viewing frustum with a perspective projection and is in the general shape of a truncated pyramid. When a graphics system 100 uses this viewing frustum, the graphics processor 105 renders objects that are located further from the vantage point of the viewer's eye 203 smaller than objects that are located closer to the viewer's eye 203. The second viewing frustum 202 is typically referred to as a viewing frustum with an orthographic projection and is generally in the shape of a box or three-dimensional rectangle. When a graphics system 100 uses this viewing frustum, the graphics processor 105 renders objects the same size regardless of their distance from the viewer's eye 203. Each viewing frustum 201, 202 is defined by six respective frustum planes. For example, viewing frustum 201 is defined by planes 205–210 and viewing frustum 202 is defined by planes 212–217.

After the host application 115 stores the vertex information in one or more vertex buffers 125, the host application 115 issues drawing commands to the graphics driver 119 via the runtime layer 117. Each drawing command typically includes an instruction (e.g., "draw"), a memory identification (system memory 107 or video card local memory 109), an address in the identified memory 107, 109 of a vertex buffer 125, and a quantity of vertices in the vertex buffer 125. Upon receiving the commands, the graphics driver 119 processes and reformats the commands into a form executable by the graphics processor 105, and stores the processed/reformatted commands in allocated areas of system memory 107 or video card local memory 109 that are accessible by the graphics processor 105. Such areas of memory 107, 109 are typically referred to as command buffers (CBs) 127. After filling a particular command buffer 127 with a group of drawing commands 201–205, the graphics driver 119 dispatches the command buffer 127 by sending a signal to the graphics processor 105 instructing the processor 105 to fetch and process the commands 201–205 in the command buffer 127. Typically, the graphics driver 119 is filling command buffers 127 faster than the graphics processor 105 can process the drawing commands 201–205 in the buffers 127. Consequently, queuing algorithms are typically employed between the graphics driver 119 and the graphics processor 105 to allow the graphics processor 105 to quickly begin processing a new command buffer 127 upon completion of processing a prior buffer 127. The graphics processor 105 typically processes the command buffers 127 in the order in which they are dispatched by the graphics driver 119.

In the prior art, the graphics driver 119 provides the drawing commands to the graphics processor 105 (i.e., stores the commands in the command buffers 127) regardless of whether or not the object or group of primitives to be rendered is within the viewing frustum 201, 202 of the display device 111. For example, if the graphics system 100 uses viewing frustum 201 and an object 219, 220 to be rendered by a drawing command is located outside of the viewing frustum 201 (e.g., to the viewer side of plane 206 or to the distal side of plane 208), the graphics driver 119 provides the drawing command to render the object 219, 220 to the graphics processor 105. As discussed above, each object 219, 220 is typically divided into several primitives, such as points, lines and/or triangles, and each primitive includes one or more vertices. The graphics processor 105 processes the vertex information for each vertex to create the desired graphics primitives of the object 219, 220 and then compares the positions of the primitives to the viewing frustum 201. If all the primitives of the object 219, 220 are outside the viewing frustum 201 (as would be the case with respect to either object 219 or object 220 because the entire object 219, 220 is outside the viewing frustum 201), the graphics processor 105 discards or deletes all the primitive data for the object 219, 220 so as not to render the object 219, 220. However, such an approach wastes graphics processor resources unnecessarily when an object 219, 220 to be rendered is outside the viewing frustum 201, 202 because the graphics processor 105 processes vertex information related to the object 219, 220 only to later delete or discard it.

Some sophisticated prior art applications 115 determine whether objects are within the viewing frustum 201, 202 before issuing drawing commands for such objects. If an object is outside the viewing frustum 201, 202, the application 115 does not issue the drawing command or commands to display the object. However, many applications 115 are not so sophisticated and issue drawing commands for all objects, leaving the determination of whether or not an object to be rendered is within the viewing frustum 201, 202 of the display device 111 to the graphics processor 105.

Therefore, a need exists for a method and apparatus for selectively providing drawing commands issued by an application to a graphics processor to improve the processing efficiency of a video graphics system, wherein the method and apparatus do not require the graphics processor to unnecessarily process vertex information relating to graphics primitives that are located outside the viewing frustum of a display device.

DETAILED DESCRIPTION OF A PREFERRED EMBODIMENT

Figure 1:
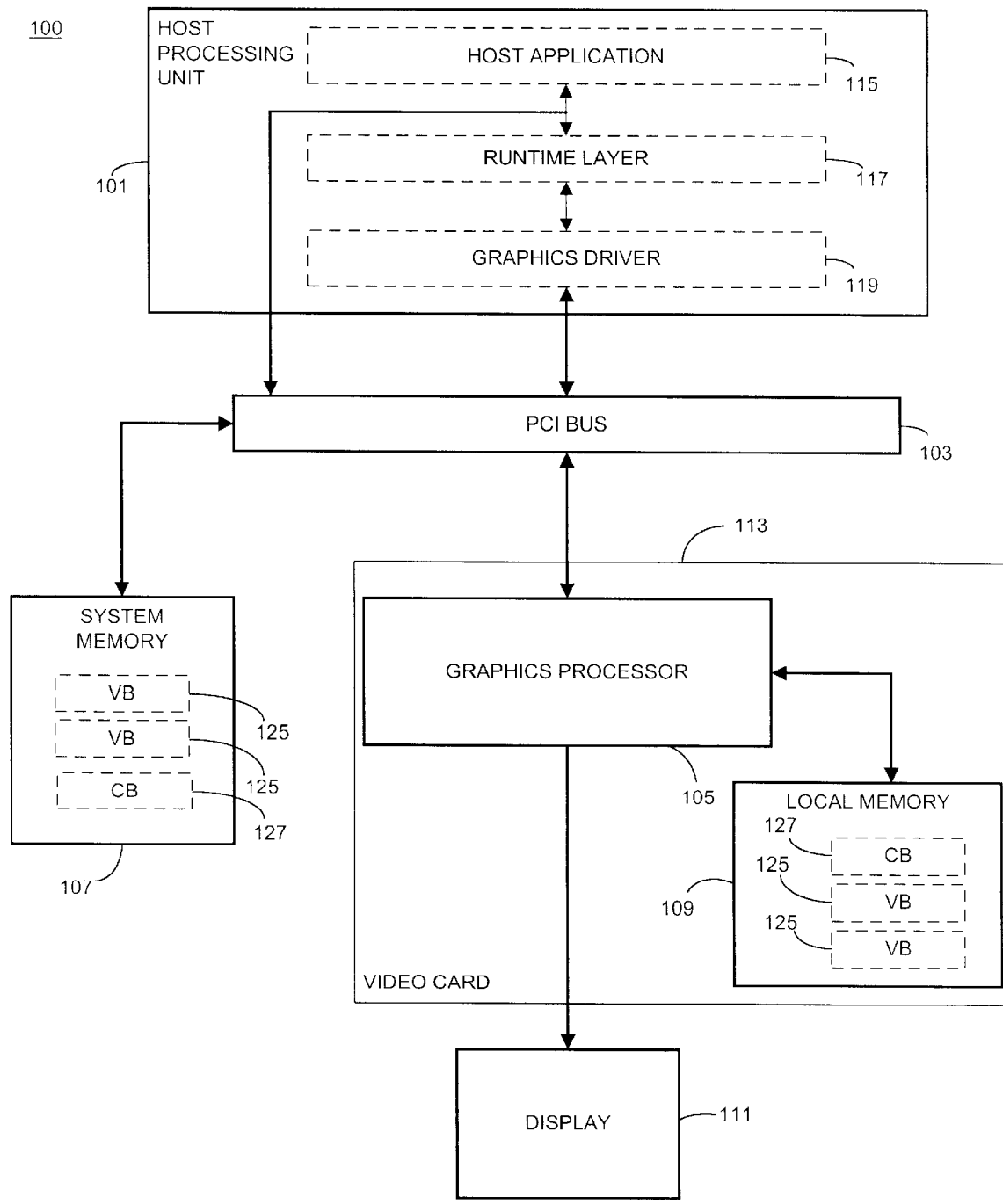
FIG. 1 is a block diagram of a conventional video graphics system that facilitates direct memory access transfers between system memory and a graphics processor.

Generally, the present invention encompasses a method and apparatus for selectively providing drawing commands to a graphics processor to improve processing efficiency of a video graphics system. The video graphics system includes a graphics driver, a graphics processor, and a memory. The graphics driver is operably coupled to an application that issues drawing commands to be processed by the video graphics system. Each drawing command requests display of one or more single-vertexed or multiple-verticed graphics primitives on a display device operably coupled to the graphics processor. Each drawing command includes an address of a location within the memory that includes vertex information for the vertices of the graphics primitives to be displayed. The vertex information is stored in the memory by the application prior to issuance of a drawing command referencing the stored vertex information. Some time after the application stores the vertex information in the memory, but preferably not later than responsive to receipt of a drawing command that references the stored vertex information, the graphics driver determines a boundary defining a volume containing the vertices corresponding to the stored vertex information. Responsive to receiving the drawing command, the graphics driver determines whether the boundary intersects a viewing volume of the display device. When at least a portion of the boundary intersects the viewing volume, the graphics driver provides the drawing command to the graphics processor; otherwise, the graphics driver preferably discards the drawing command.

By selectively providing a drawing command to the graphics processor in this manner, the present invention improves the processing efficiency of a video graphics system in comparison to prior art systems because, with the present invention, a drawing command is provided to the graphics processor only when the vertex information referenced in the command results in at least a portion of the graphics primitive appearing in the viewing volume of the display device. By contrast, prior art video graphics systems provide the drawing commands to the graphics processor for primitive generation and other processing based on the vertex information referenced in the commands before any analysis is performed to determine whether or not the generated primitive will be within the viewing volume, and thus viewable by a user of the display device. By evaluating whether or not any of the vertex information referenced in a drawing command will result in at least at least a portion of a graphics primitive being displayed within the display device's viewing volume before providing the drawing command to the graphics processor, the present invention eliminates unnecessary vertex information processing and primitive generation by the graphics processor, thereby improving the overall speed and efficiency of the graphics system.

Figure 3:
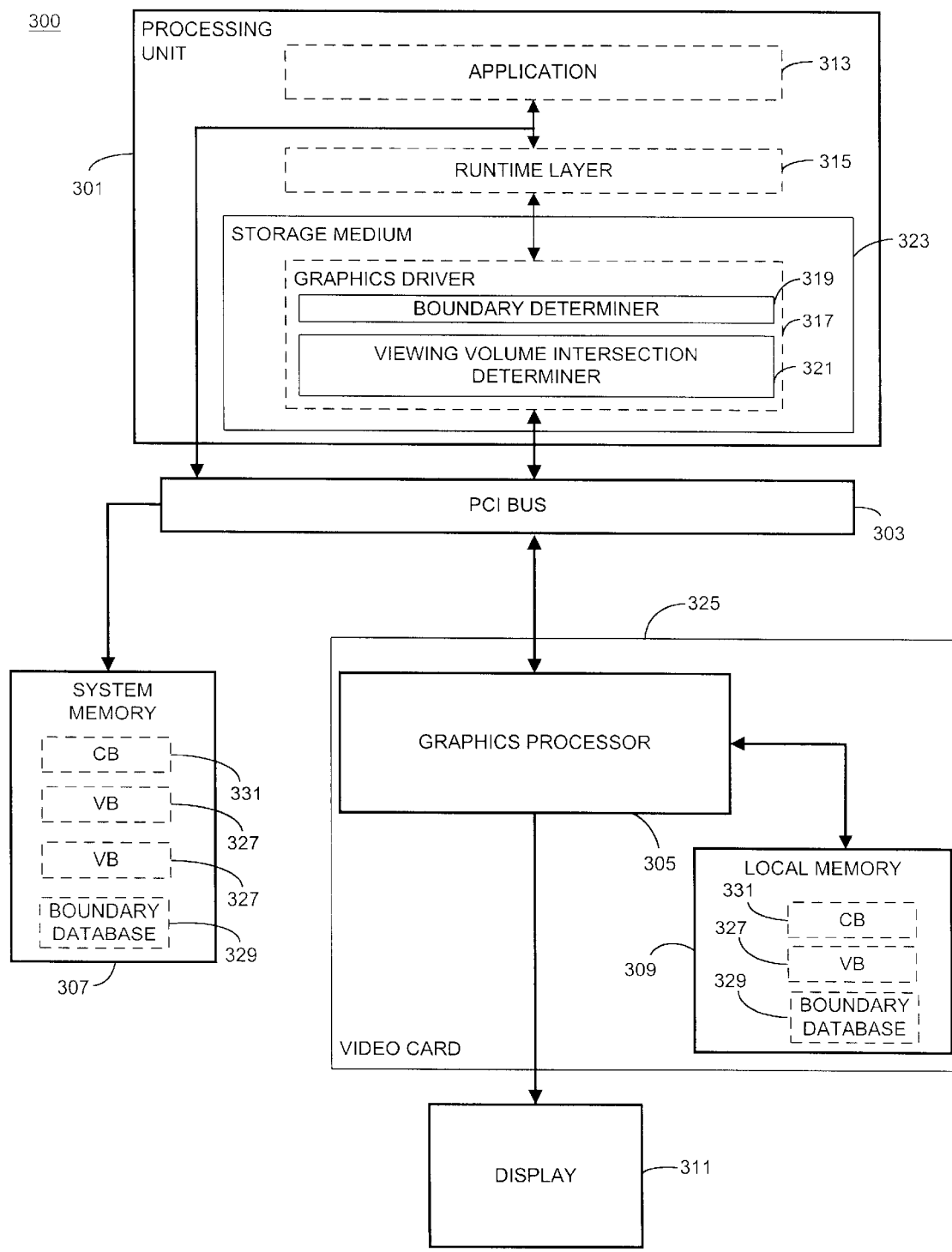
FIG. 3 is a block diagram of a video graphics system in accordance with the present invention.

The present invention can be more fully understood with reference to FIGS. 3–6, in which like reference numerals designate like items. FIG. 3 illustrates a block diagram of a video graphics system 300 in accordance with the present invention. Similar to the video graphics system 100 of FIG. 1, the video graphics system 300 of FIG. 3 includes a processing unit 301, a PCI bus 303, a graphics processor 305, system memory 307, local graphics memory 309, and a display 311. The processing unit 301 may be a central processing unit (CPU) or any single or multiple microprocessor-based processing device, such as a handheld Internet appliance, a laptop computer, a palmtop computer, a personal computer, a workstation, a personal digital assistant (PDA), a set top box, a wireless communication device (e.g., a two-way radio, a radiotelephone, a wireless data device, a pager, or any wireless device combining functionality of any of the foregoing devices), or any other suitable computing device or devices that execute a software application 313, an operating system runtime software layer 315, and a graphics driver software component 317. In accordance with the present invention, the application 313 may be any software application which requests objects to be displayed on the display 311 and, during operation, stores vertex information (e.g., vertex position and color parameters) in system memory 307 or in video card local memory 309. For example, the application 313 might be a word processing application, a video game, a computer game, a spreadsheet application, a web-based application, or any other application that requires two-dimensional or three-dimensional objects to be displayed on a display device 311. The application 313 initiates all drawing commands and provides all information necessary for the other graphics applications and processing components to display objects on the display device 311.

The operating system runtime software layer 315 may be any conventional runtime operating system component application that provides an API and/or a DDI to other applications, such as the graphics driver 317, which must communicate with the drawing-initiating application 313. One such operating system runtime layer 315 is the "DIRECTX7" operating system component application of the "WINDOWS" family of operating systems that is commercially available from Microsoft Corporation of Redmond, Wash.

The graphics driver 317 is preferably a software application of operating instructions that is stored on a computer readable storage medium 323, such as a compact disc read only memory (CD-ROM), a floppy disk, a digital versatile disk (DVD), a hard disk, a ZIP disk, or a solid-state component, and is sold as a unit with the video card 325. Alternatively, the graphics driver 317 may be a software application stored on a remote storage medium and downloaded into a hard disk or other component (not shown) of system memory 307 over a wide area network, such as the Internet. Still further, the graphics driver 317 may be any device or combination of devices, whether in hardware, software, or firmware, that allow multiple applications 313 to simultaneously store vertex information in memory 307, 309 and issue drawing commands to a graphics processor 305. Regardless of the type of permanent storage medium 323, the processing unit 301 preferably loads the software-implemented graphics driver 317 into a temporary storage medium 323, such as random access memory (RAM), during execution of the drawing-initiating application 313 or as necessary by the operating system. In contrast to prior art graphics drivers, the graphics driver 317 of the present invention includes software modules 319, 321 that respectively determine a boundary of a volume containing the object or group of graphics primitives which is the subject of a drawing command and determine whether any portion of the boundary intersects the viewing volume of the display device 311 to ultimately determine whether or not the object or group of graphics primitives are located within the viewing volume of the display device 311. Operation of the graphics driver 317 in accordance with the present invention is provided in detail below.

The graphics processor 305 is typically located on a video card 323 together with local memory 309 which is accessed and used regularly by the graphics processor 305. The graphics processor 305 is preferably embodied in an application specific integrated circuit (ASIC) and may include a single processing entity or multiple processing entities. Such a processing entity may be a microprocessor, a microcontroller, a digital signal processor (DSP), a state machine, logic circuitry, or any other device that processes information based on operational or programming instructions. One of ordinary skill in the art will recognize that when the graphics processor 305 has one or more of its functions performed by a state machine or logic circuitry, the memory containing the corresponding operational instructions may be embedded within the state machine or logic circuitry.

The PCI bus 303 is well known and typically includes appropriate hardware to couple the processing unit 301 to the system memory 307 and the graphics processor 305, and to couple the graphics processor 305 to the system memory 307. For example, depending on the system configuration, the PCI bus 303 may include a memory and bus controller integrated circuit (IC) and an accelerated graphics port (AGP) bus, which are commercially available from Intel Corporation of Santa Clara, Calif. and Via Technologies, Inc. of Fremont, Calif. to facilitate direct memory access (DMA) transfers of data stored in the system memory 307 to the graphics processor 305. Alternatively, one or more of the graphics processor 305, the processing unit 301 and the PCI bus memory and bus controller may be combined into a single IC. In such an alternative embodiment, an internal bus would be included on the IC to couple the graphics processor 305 to the PCI bus memory and bus controller.

The system memory 307 typically includes at least two memory components, at least one of which is a cacheable and swappable RAM component that is not accessible by the graphics processor 305 and at least another of which is accessible by the graphics processor 305. The graphics processor-accessible memory component of the system memory 307 is preferably a conventional accelerated graphics port (AGP) memory component. The system memory 307 may also include various other forms of memory, such as read only memory (ROM), floppy disks, CD-ROMs, a hard disk drive, a DVD or any other medium for storing digital information. With respect to the present invention, the system memory 307 is used to store vertex information (e.g., in vertex buffers 327 allocated by either the application 313 or the graphics processor 305 as described in detail below) and may be used to store drawing commands (e.g., in command buffers 331) and a boundary database 329 in which the boundary determiner module 319 of the graphics driver 317 stores boundaries of volumes associated with at least some of the vertex buffers 327 as described in detail below. The system memory 307 is also preferably used to store programming and/or operational instructions that, when executed by the processing unit 301, enable the processing unit 301 to perform the functions of the graphics driver 317 and its associated software modules 319, 321, which functions are described in detail below with respect to FIG. 6. As depicted in FIG. 3, the system memory 307 is located external to the video card 323 containing the graphics processor 305.

The video card local memory 309 preferably includes RAM, but may also include ROM or any other medium for storing digital information. With respect to the present invention, the video card local memory 309 may be used to store vertex information (e.g., in vertex buffers 327 allocated by either the application 313 or the graphics processor 305 as described in detail below), drawing commands (e.g., in command buffers 329), and/or the boundary database 329. The video card local memory 309 is also preferably used to store programming and/or operational instructions that, when executed by the graphics processor 305, enable the graphics processor 305 to perform at least some of the vertex information processing.

The display device 311 may be any conventional cathode ray tube (CRT) display, liquid crystal display (LCD), or other display. Although not shown for purposes of clarity, other components, such as a video frame buffer, a video signal generator, and other known 3D pipeline components, are preferably incorporated between the graphics processor 305 and the display device 311 to properly display primitives rendered by the graphics processor 305.

Figure 4:
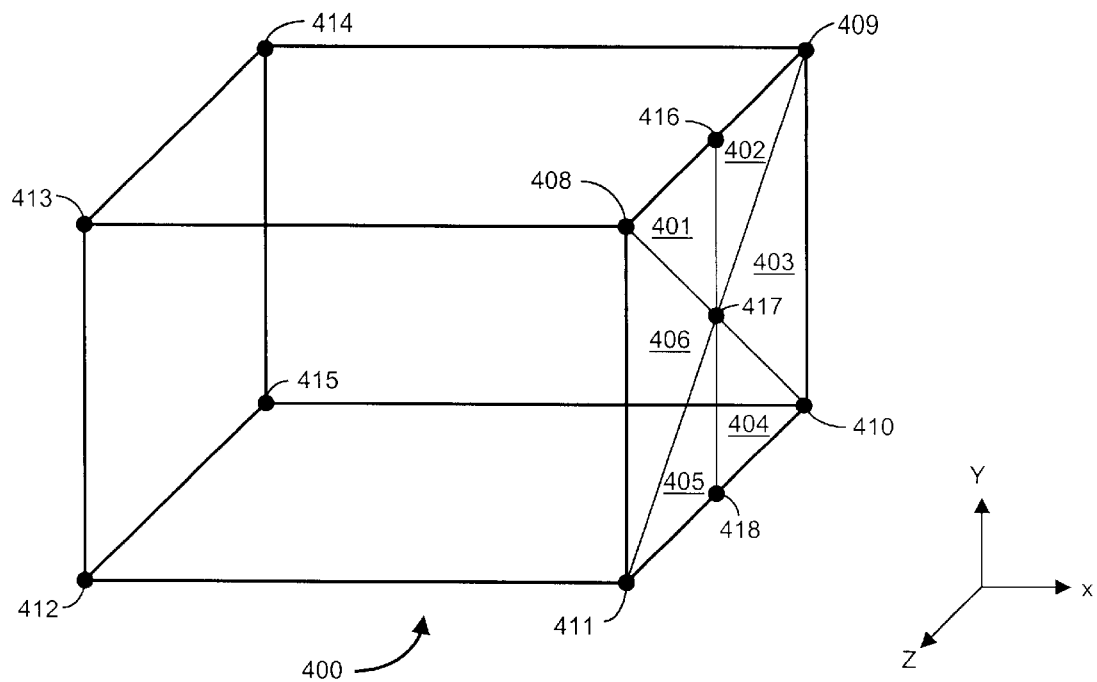
FIG. 4 is a three-dimensional view of an exemplary object or object portion to be rendered for display by the video graphics system of FIG. 3, wherein the object or object portion is divided into multiple graphics primitives and each graphics primitive includes multiple vertices.
Figure 5:
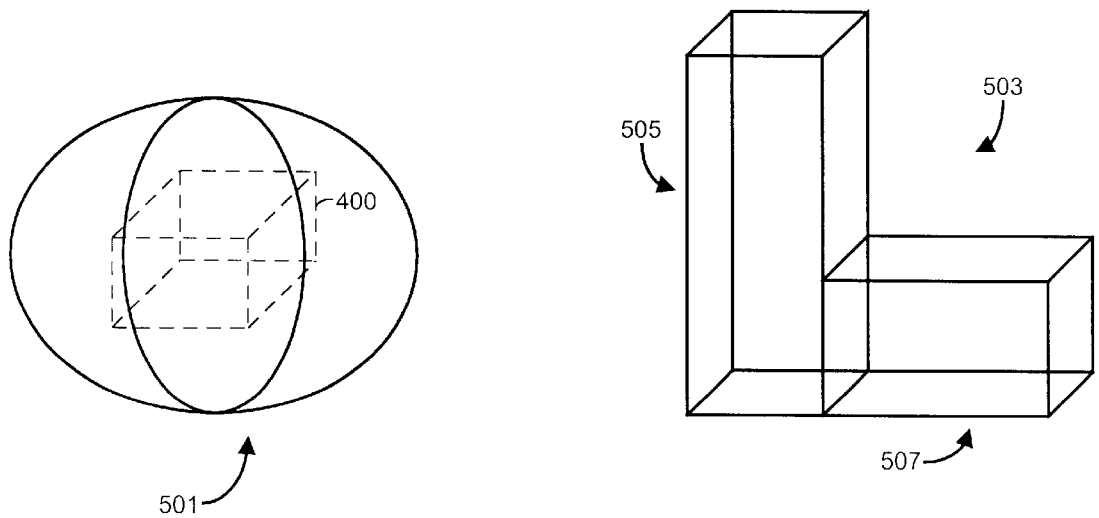
FIG. 5 illustrates three-dimensional views of alternative boundaries of volumes containing graphics primitives in accordance with the present invention.
Figure 6:
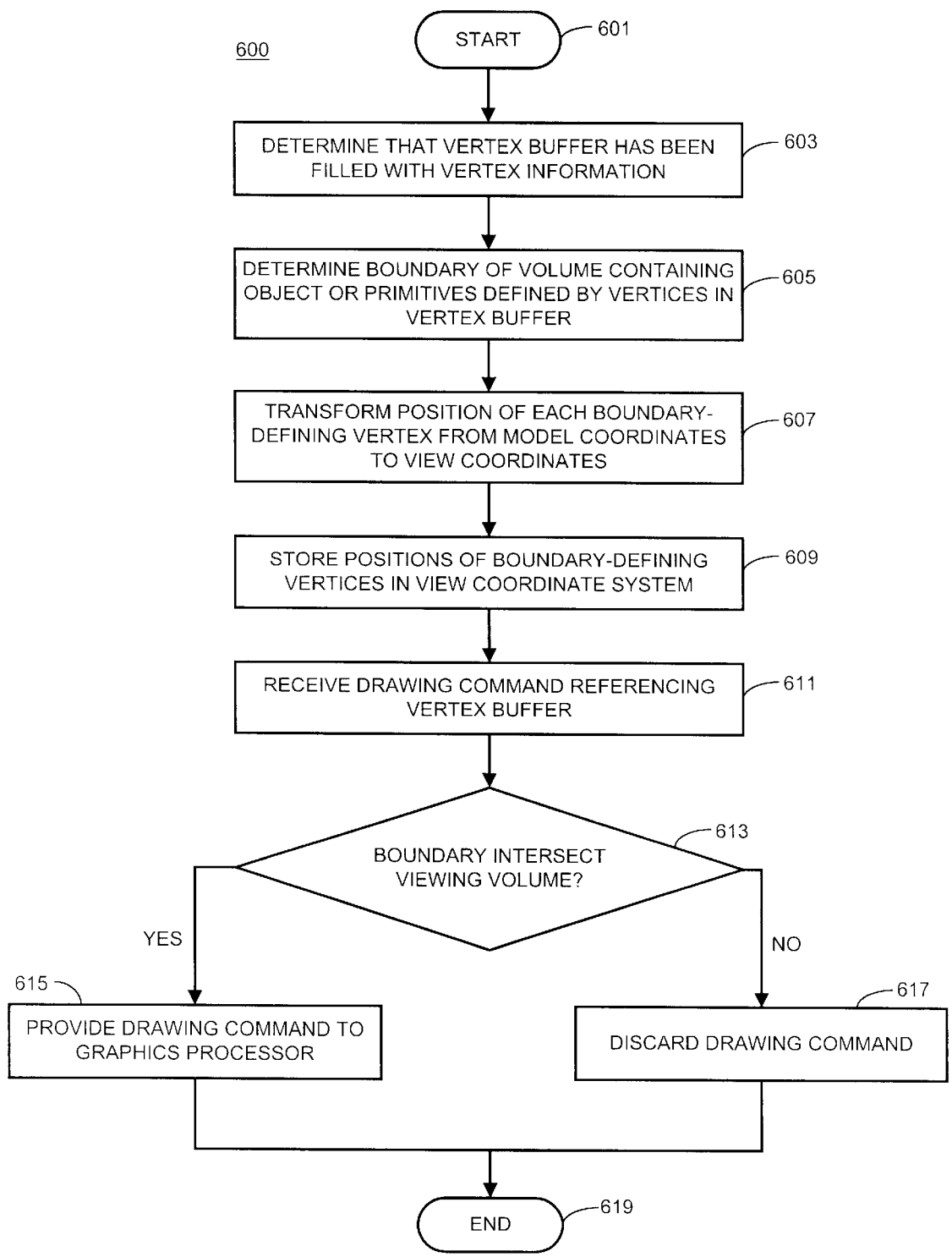
FIG. 6 is a logic flow diagram of steps executed by a graphics driver to selectively provide drawing commands to a graphics processor in accordance with a preferred embodiment of the present invention.

Operation of the video graphics system 300 in accordance with a preferred embodiment can be more fully understood with additional reference to FIGS. 4–6. FIG. 6 is a logic flow diagram 600 of steps executed by the graphics driver 317 to selectively provide drawing commands to the graphics processor 305 in accordance with the preferred embodiment. As discussed above, the graphics driver 317 is preferably implemented as a software algorithm stored on a computer-readable storage medium, such as any form of RAM, any form of read only memory (ROM) (including, without limitation, programmable ROM (PROM) and CD-ROM), any form of magnetic storage media (including, without limitation, a floppy disk or a magnetic tape), a digital versatile disk (DVD), any combination of the foregoing types of media, Such as a hard drive, or any other device that stores digital information.

Prior to issuing a drawing command to display a particular object, such as the three-dimensional rectangular object 400 depicted in FIG. 4, the application 313 stores vertex information (e.g., vertex position, color, and other attribute parameters) in a vertex buffer 327 for each vertex 408–418 of each graphics primitive used by the application 313 to construct the object 400. The vertex buffer 327 may be stored in the system memory 307 or in the video card local memory 309. To reduce the complexity of FIG. 4, exemplary graphics primitives 401–406 are shown to illustrate the construction of only a portion (e.g., a plane) of the object 400. One of ordinary skill in the art will recognize that the object 400 depicted in FIG. 4 would likely be constructed of many additional primitives. One of ordinary skill in the art will further recognize that the object 400 depicted in FIG. 4 may constitute a small portion of a much larger object to be rendered and displayed on the display device 311 by the video graphics system 300.

The logic flow begins (601) when the graphics driver 317 determines (603) that a vertex buffer 327 has been filled with vertex information (e.g., is static). Some applications 313 notify the graphics driver 317 directly via the runtime layer 315 upon completion of filling a vertex buffer 327. Such notification typically includes the address of the vertex buffer 327. Other applications 313 do not notify the graphics driver 317 directly. Consequently, the graphics driver 317 may determine a vertex buffer 327 has been filled by detecting frequent use of the vertex buffer 327 without recent updates to it.

As noted above, the vertex information typically includes several vectors for each vertex 408–418, one vector of which defines the position of the vertex 408–418 in a reference coordinate system, generally referred to as the "model" coordinate system. The position of the vertex in the model coordinate system is typically transformed by the graphics processor 305 to a respective position in the coordinate system of the viewing frustum of the display device 311 after the graphics processor 305 receives the drawing command from the graphics driver 317. The coordinate system of the viewing frustum of the display device 311 is generally referred to as the "view" coordinate system or the "eye" coordinate system. In accordance with the present invention, model coordinate-to-view coordinate transformations are performed by the graphics driver 317 on the positions of certain vertices 408–415, as described below, to enable the graphics driver 317 to determine whether the object 400 or primitives represented by the vertices 408–418 for which vertex information is stored in the vertex buffer 327 are within the viewing frustum or other viewing volume of the display device 311. As discussed above, the application 313 stores transformation matrices in memory 307, 309 accessible by the graphics processor 305 to facilitate model coordinate-to-view coordinate transformations. Such matrices are also accessible by the graphics driver 317, although the graphics driver 317 does not typically use them to transform vertices.

After determining that a vertex buffer 327 has been filled with vertex information, the graphics driver preferably determines (605) an appropriately-dimensioned boundary containing the object 400 or primitives defined by the vertices 408–418 for which vertex information is stored in the vertex buffer 327. The dimensions of the boundary coincide with the dimensions of the vertices 408-418. That is, if the primitives or object defined by the vertices 408–418 is two-dimensional, the determined boundary need only be two-dimensional. On the other hand, if the primitives or object 400 defined by the vertices 408–418 is three-dimensional, the determined boundary must be three-dimensional.

The technique for determining the boundary depends on the geometry of the boundary. In a preferred embodiment, the boundary is in the shape of a three-dimensional rectangle. Therefore, to determine the bounding planes of the three-dimensional rectangle boundary, the graphics driver 317 scans the model coordinate position values of the vertices 408–418 in the x, y, and z-directions and selects the eight vertices 408–415 having the maximum and minimum position values in each direction. For the object 400 depicted in FIG. 4, the boundary is preferably defined by the vertices 408–415 having vertex positions $(X_{min}, Y_{min}, Z_{min})$, $(X_{min}, Y_{max}, Z_{min})$, $(X_{min}, Y_{min}, Z_{max})$, $(X_{min}, Y_{max}, Z_{max})$, $(X_{max}, Y_{min}, Z_{min})$, $(X_{max}, Y_{max}, Z_{min})$, $(X_{max}, Y_{max}, Z_{max})$, and $(X_{max}, Y_{min}, Z_{max})$ in the model coordinate system. Alternatively, referring to FIG. 5, the boundary 501 may be the outer surface of a three-dimensional ellipse 501, such as a sphere, encasing the object 400 or group of primitives defined by the vertices 408–418 for which vertex information is stored in the vertex buffer 327, or the boundary 503 may be a union of multiple boundaries 505, 507, wherein each boundary 505, 507 is defined by a respective group of the vertices for which vertex information is stored in the vertex buffer 327.

Still further, the boundary may include artificially-created vertices having positions derived from the vertex information in the vertex buffer 327, such that the object 400 or group of primitives defined by the vertices 408–418 for which vertex information is stored in the vertex buffer 327 is surrounded by the boundary as opposed to forming part of the boundary. For example, the boundary-defining vertices may have vertex positions that are ten percent greater than the maximum position values and ten percent less than the minimum position values of vertices 408–415 to form a three-dimensional rectangular boundary that completely surrounds the object 400.

After the graphics driver 317 determines the boundary of the volume containing the object 400 or group of primitives defined by the vertices 408–418 in the vertex buffer 327, the graphics driver 317 transforms (607) the position vector of each boundary-defining vertex 408–415 from model coordinates to view coordinates. The graphics driver 317 preferably uses the transformation matrices stored by the application 313 to transform the positions of the boundary-defining vertices 408–415 to view coordinates in accordance with known techniques. Once the vertex positions of the boundary-defining vertices 408–415 are in view coordinates, the graphics driver 317 stores (609) the positions of the vertices 408–415 in a boundary database 329. As noted above, the boundary database 329 may be stored in the system memory 307. In the preferred embodiment, the primitive or object boundary is determined prior to receiving (611) a drawing command from the application 313 referencing the vertex buffer 327 for which the boundary was determined. In an alternative embodiment, if the application 313 does not provide notification to the graphics driver 317 informing the graphics driver 317 that the vertex buffer 327 has been filled before issuing a drawing command referencing the vertex buffer 327, the graphics driver 317 may perform the operations of steps 603–609 after receiving (611) the drawing command referencing the vertex buffer 327.

In the preferred embodiment, some time after determining the boundary for the vertex buffer 327, the graphics driver 317 receives (611) a primitive rendering or drawing command from the application 313 via the runtime layer 315. The drawing command preferably includes an address of the vertex buffer 327 containing the vertex information for the object 400 or group of primitives to be rendered by the graphics system 300.

Upon receiving the drawing command, the graphics driver 317 determines (613) whether the boundary for the vertex buffer 327 intersects the viewing volume (e.g., viewing frustum) of the display device 311. In a preferred embodiment, such a determination is made by retrieving the x, y, and z view coordinates of each boundary-defining vertex 408–415 from the boundary database 329 and inputting the retrieved coordinates on a vertex-by-vertex basis into a mathematical formula defining a perimeter plane of the viewing volume. If the result of the computation is less than zero, then the vertex 408–415 is located on the non-viewing volume side of the plane (i.e., outside the viewing volume). If the result of the computation is greater than or equal to zero, then the vertex 408–415 is potentially within the viewing volume and located either on the plane (when the result is zero) or on the viewing volume side of the plane (when the result is greater than zero). If all the boundary-defining vertices 408–415 are located on the non-viewing volume side of any plane of the viewing volume (e.g., outside any plane 205–210 of viewing frustum 201), the boundary does not intersect the viewing volume. On the other hand, if at least one boundary-defining vertex 408–415 remains on the viewing volume side of each plane of the viewing volume after evaluating the plane formula for each plane of the viewing volume, the boundary intersects the viewing volume.

In a further embodiment, when the boundary 501, 503 is the outer surface of a sphere or other three-dimensional ellipsoid encasing the object 400 or group of primitives as illustrated in one embodiment of FIG. 5, or the union of multiple boundaries 505, 507 as illustrated in the other embodiment depicted in FIG. 5, the graphics driver 317 preferably evaluates a respective mathematical formula defining a perimeter surface of the viewing volume to determine whether or not a particular vertex position on the selected boundary 501, 503 is within the viewing volume.

Figure 2:
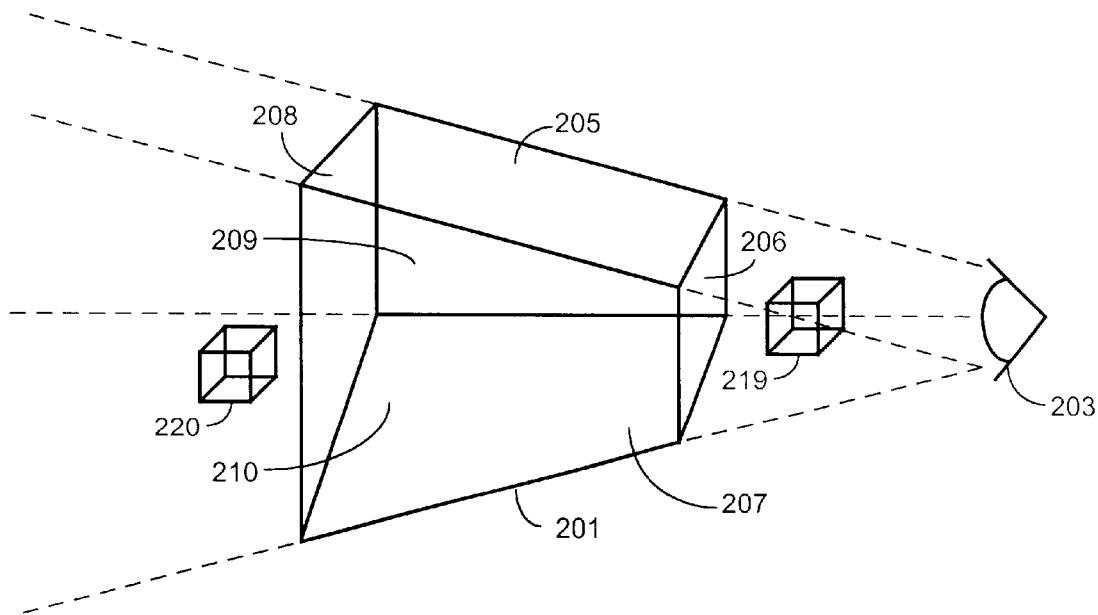
FIG. 2 illustrates three-dimensional views of two typical viewing frustums in which graphics primitives can theoretically be seen by a user when viewing the display device of FIG. 1.
Figure 2:
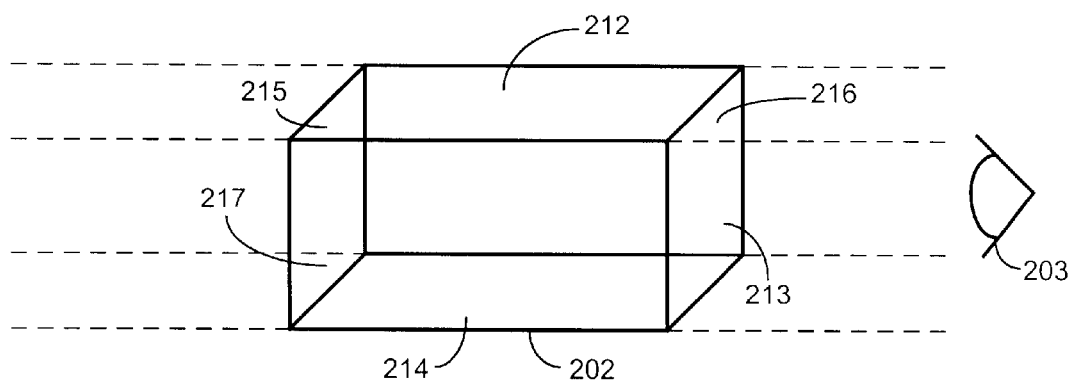

It will be appreciated by those of ordinary skill in the art that the use of a plane formula for evaluating the location of a boundary-defining vertex 408-415 with respect to the plane applies only when the viewing volume is constructed of multiple intersecting planes, such as when the viewing volume is one of the viewing frustums 201, 202 depicted in FIG. 2. If the viewing volume is not defined by a group of intersecting planes, each boundary-defining vertex 408–415 would be evaluated with respect to the appropriate formula defining the surface or surfaces of the particular viewing volume. For example, if the viewing volume was a sphere, each boundary-defining vertex 408–415 would be evaluated with respect to the formula defining the surface of a sphere.

To minimize the processing time required to determine whether the boundary intersects the viewing volume, the graphics driver 317 preferably evaluates each plane formula for all boundary-defining vertices 408–415 on a plane-by-plane basis. If all the boundary-defining vertices 408–415 are determined to be on the non-viewing volume side of any plane, the graphics driver 317 ends the evaluation and determines that the boundary does not intersect the viewing volume. That is, once all the boundary-defining vertices 408–415 have been determined to be outside the viewing volume (e.g., viewing frustum 201), the boundary does not intersect the viewing volume and no more evaluation and/or processing is needed.

For example, if the viewing volume is viewing frustum 201 of FIG. 2, the plane formula for the six planes 205–210 defining the viewing frustum 201 is as follows:

$$A_i(x-x_i)+B_i(y-y_i)+C_i(z-z_i) \text{ for plane } i,$$

where $<A_i, B_i, C_i>$ is a vector normal to plane i,
where $(x_i, y_i, z_i)$ is on plane i when $A_i(x-x_i)+B_i(y-y_i)+C_i(z-z_i)$ equals zero,
where $(x_i, y_i, z_i)$ is below (or to a non-viewing frustum side of) plane i when $A_i(x-x_i)+B_i(y-y_i)+C_i, (z-z_i)$ is less than zero, and
where $(x_i, y_i, z_i)$ is above (or to a viewing frustum side of) plane i when $A_i(x-x_i)+B_i(y-y_i)+C_i(z-z_i)$ is greater than zero.

If the object 400 defined by the vertices 408–418 in the vertex buffer 327 is located on the viewer side of plane 206 (e.g., at the same location as object 219), the graphics driver 317 need only evaluate the plane formulas until it determines that all the boundary-defining vertices 408–415 are to the non-viewing volume side of plane 206, at which point it can determine that the boundary, and therefore each vertex 408–418 for which vertex information is stored in the vertex buffer 327, does not intersect or lie within the viewing frustum 201.

When the graphics driver 317 determines that the boundary intersects the viewing volume, the graphics driver 317 provides (615) the drawing command to the graphics processor 305 via the PCI bus 303, and the logic flow ends (619). In a preferred embodiment, the graphics driver 317 stores the drawing command as an indexed command (e.g., an indexed primitive list command or indexed primitive strip command) in a command buffer 331 for subsequent retrieval and execution by the graphics processor 305. If the drawing command is provided to the graphics processor 305 and the vertex buffer 327 referenced in the drawing command is located in a graphics processor-inaccessible memory component of the system memory 307, the graphics driver 317 may create a temporary vertex buffer (not shown) in a graphics processor-accessible component of the system memory 307 or in the video card local memory 309, as described in detail in co-pending, commonly assigned U.S. patent application Ser. No. 09/716,735, entitled "Method and Apparatus for Efficiently Processing Vertex Information in a Video Graphics System" and filed on Nov. 20, 2000. The graphic driver's creation of such a temporary vertex buffer enables the graphics processor 305 to more expediently and efficiently process the vertex information than if the graphics driver 317 had merely included the vertex information as part of the drawing command stored in the command buffer 331.

On the other hand, when the graphics driver 317 determines that the boundary does not intersect the viewing volume, the graphics driver 317 discards (617) or deletes the drawing command, and the logic flow ends (619), thereby preventing the graphics processor 305 from unnecessarily processing vertex information for primitives which arc not part of a graphics scene and saving graphics processor processing cycles.

The present invention encompasses a method and apparatus for selectively providing drawing commands to a graphics processor to improve the processing efficiency of a video graphics system. With this invention, the graphics driver provides drawing commands issued by an application to the graphics processor only in the event that the drawing commands reference vertex buffers containing vertex information for primitive vertices actually forming part of a graphics scene that will be viewable on a display device. By providing drawing commands to the graphics processor only under such circumstances, the present invention mitigates unnecessary processing of vertex information by the graphics processor and increases the speed and efficiency of video graphics systems as compared to prior art systems.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A method for a graphics driver to selectively provide a drawing command to a graphics processor, the method comprising the steps of:
determining a boundary based on vertex information stored in a memory by an application, the boundary defining a volume in which a plurality of vertices defined by the vertex information are located;
receiving a drawing command from the application, the drawing command including an address of a location within the memory that includes the vertex information;
determining whether at least a portion of the boundary intersects a viewing volume, the viewing volume corresponding to a theoretical volume in which graphics primitives can be seen when viewing a display device; and providing the drawing command to the graphics processor only in the event that at least a portion of the boundary intersects the viewing volume.

2. The method of claim 1, further comprising the step of:

discarding the drawing command in the event that no portion of the boundary intersects the viewing volume.

3. The method of claim 1, wherein the vertex information includes respective position information for each vertex of the plurality of vertices and wherein the step of determining a boundary comprises the step of:

determining a boundary based on the position information.

4. The method of claim 3, wherein the boundary includes a group of boundary vertices defining the boundary, each boundary vertex having a respective position, wherein the position of each boundary vertex is in a first coordinate system and wherein the viewing volume is defined relative to a second coordinate system, the method further comprising the step of:

transforming the position of each boundary vertex into the second coordinate system prior to determining whether at least a portion of the boundary intersects the viewing volume.

5. The method of claim 4, wherein the first coordinate system is a model coordinate system and wherein the second coordinate system is a view coordinate system.

6. The method of claim 1, wherein the boundary comprises a boundary of a three-dimensional rectangle, the method further comprising the step of:

determining a group of boundary vertices defining the boundary, each boundary vertex having a respective position.

7. The method of claim 6, wherein the step of determining whether at least a portion of the boundary intersects the viewing volume comprises the steps of:

inputting the respective position of each boundary vertex of the group of boundary vertices individually into a mathematical formula, the mathematical formula defining a plane of the viewing volume when a result of the mathematical formula is zero; and determining whether each boundary vertex of the group of boundary vertices is positioned on a non-viewing volume side of the plane based on results of the mathematical formula.

8. The method of claim 7, further comprising the step of:

repeating the steps of inputting the respective position of each boundary vertex of the group of boundary vertices individually into a mathematical formula and determining whether each boundary vertex of the group of boundary vertices is positioned on a non-viewing volume side of the plane for each plane of the viewing volume.

9. The method of claim 7, further comprising the step of:

discarding the drawing command in the event that each boundary vertex of the group of boundary vertices is positioned on the non-viewing volume side of the plane.

10. The method of claim 1, wherein the boundary comprises a three-dimensional ellipsoid.

11. The method of claim 1, wherein the boundary comprises a union of a plurality of boundaries, each of the plurality of boundaries being based on vertex information for a respective group of the plurality of vertices.

12. The method of claim 1, wherein the viewing volume is a view frustum of the display device.

13. A storage medium for use in a video graphics system, the storage medium comprising:

first memory including operating instructions that, when executed, cause at least one processing device to perform at least the following functions in the event that vertex information for a plurality of vertices is stored by an application in at least one of the first memory and a second memory of the video graphics system:

determine a boundary based on the vertex information, the boundary defining a volume in which a plurality of vertices defined by the vertex information are located;

receive a drawing command from the application, the drawing command including an address of a location within at least one of the first memory and the second memory that includes the vertex information;

determine whether at least a portion of the boundary intersects a viewing volume, the viewing volume corresponding to a theoretical volume in which graphics primitives can be seen when viewing a display device; and provide the drawing command to the graphics processor only in the event that at least a portion of the boundary intersects the viewing volume.

14. The storage medium of claim 13, wherein the first memory further includes operating instructions that, when executed, cause the at least one processing device to:

discard the drawing command in the event that no portion of the boundary intersects the viewing volume.

15. The storage medium of claim 13, wherein the boundary includes a group of boundary vertices defining the boundary, each boundary vertex having a respective position, wherein the position of each boundary vertex is in a first coordinate system and the viewing volume is defined relative to a second coordinate system, and wherein the first memory further includes operating instructions that, when executed, cause the at least one processing device to:

transform the position of each boundary vertex into the second coordinate system before executing the instruction to determine whether at least a portion of the boundary intersects a viewing volume.

16. The storage medium of claim 13, wherein the boundary is a boundary of a three-dimensional rectangle and wherein the first memory further includes operating instructions that, when executed, cause the at least one processing device to:

determine a group of boundary vertices defining the boundary, each boundary vertex having a respective position.

17. The storage medium of claim 16, wherein the operating instructions that, when executed, cause the at least one processing device to determine whether at least a portion of the boundary intersects a viewing volume include operating instructions to cause the at least one processing device to:

input the respective position of each boundary vertex of the group of boundary vertices individually into a mathematical formula, the mathematical formula defining a plane of the viewing volume when a result of the mathematical formula is zero; and determine whether each boundary vertex of the group of boundary vertices is positioned on a non-viewing volume side of the plane based on results of the mathematical formula.

18. The storage medium of claim 17, wherein the first memory further includes operating instructions that, when executed, cause the at least one processing device to:

repeat, for each plane of the viewing volume, the operating instructions that cause the at least one processing device to input the respective position of each boundary vertex of the group of boundary vertices individually into a respective mathematical formula and determine whether each boundary vertex of the group of boundary vertices is positioned on a non-viewing volume side of each plane based on results of the respective mathematical formula.

19. The storage medium of claim 17, wherein the first memory further includes operating instructions that, when executed, cause the at least one processing device to:

discard the drawing command in the event that each boundary vertex of the group of boundary vertices is positioned on the non-viewing volume side of the plane.

20. The storage medium of claim 13, wherein the boundary comprises a union of a plurality of boundaries, each of the plurality of boundaries being based on vertex information for a respective group of the plurality of vertices.

21. The storage medium of claim 13, wherein the storage medium comprises at least one of a random access memory, a read only memory, a floppy disk, a hard drive, a CD-ROM, and a digital versatile disk (DVD).

22. A video graphics system for selectively displaying graphics primitives on a display device responsive to receiving at least one drawing command from an application, the video graphics system comprising:

a memory containing vertex information associated with a plurality of vertices defining at least one graphics primitive;

a graphics driver operably coupled to the application, the memory and the graphics processor, the graphics driver configured to:

determine a boundary based on the vertex information stored in the memory, the boundary defining a volume in which the at least one graphics primitive is located;

receive a drawing command from the application, the drawing command including an address of a location within the memory that includes the vertex information;

determine whether at least a portion of the boundary intersects a viewing volume, the viewing volume corresponding to a theoretical volume in which graphics primitives can be seen when viewing the display device; and discard the drawing command in the event that no portion of the boundary intersects the viewing volume.

23. The video graphics system of claim 22, wherein the graphics driver is further configured to:

provide the drawing command to a graphics processor in the event that at least a portion of the boundary intersects the viewing volume.

* * * * *